US008787312B2

(12) United States Patent
Lindskog et al.

(10) Patent No.: US 8,787,312 B2
(45) Date of Patent: Jul. 22, 2014

(54) APPARATUS AND METHOD FOR IMPROVED HANDOVER PERFORMANCE

(75) Inventors: Jan Lindskog, Pixbo (SE); Dag Robert Edvin Almqvist, Molndal (SE); Roger Wallerius, Savedalen (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 206 days.

(21) Appl. No.: 13/142,670

(22) PCT Filed: Dec. 30, 2008

(86) PCT No.: PCT/EP2008/068363
§ 371 (c)(1),
(2), (4) Date: Jun. 29, 2011

(87) PCT Pub. No.: WO2010/075892
PCT Pub. Date: Jul. 8, 2010

(65) Prior Publication Data
US 2011/0268088 A1 Nov. 3, 2011

(51) Int. Cl.
H04W 4/00 (2009.01)
(52) U.S. Cl.
USPC ............ 370/331; 370/252; 370/394; 455/436
(58) Field of Classification Search
USPC ......... 370/235, 327, 328, 331, 332, 469, 394, 370/315, 329, 352; 455/436, 442; 714/748
See application file for complete search history.

(56) References Cited

U.S. PATENT DOCUMENTS 7,430,206 B2 * 9/2008 Terry et al. .................... 370/394
7,627,317 B2 12/2009 Raji et al.

(Continued)

FOREIGN PATENT DOCUMENTS

EP  1641190 A1   3/2006
JP  2006502609 A  1/2006

(Continued)

OTHER PUBLICATIONS

Office Action issued on Feb. 14, 2013 in corresponding Japanese application No. 2011-542686, 2 pages.

Primary Examiner — Jeffrey M Rutkowski
Assistant Examiner — Harun Chowdhury
(74) Attorney, Agent, or Firm — Rothwell, Figg, Ernst & Manbeck, P.C.

(57) ABSTRACT

There is provided a method in a first base (Node_B_S) station adapted to receive media access control layer packet data units (MAC-d; PDU 101, 102, 104, 105) from a radio network controller (RNC) relating to at least a traffic flow relating to a given user entity (UE_Q) and forwarding (MAC-hs/MAC-ehs) such packet data units to said user entity. The transmission to the given user entity is adapted to be potentially handed over to at least a second radio base station (Node B_T), the method being characterized in the following steps:—the first base station (Node_B_S) continuously updating (12, 33, 335, 41) at least a data structure (UNACK_MACD_CNT) relating to media access control layer packet data units (MAC-d PDU's) of a priority queue of the user entity, which packet data units are recently transmitted from a protocol layer (RLC) in the radio network controller (RNC RLC) whereby at least some of said packet data units may not be received by a corresponding protocol layer (RLC) in the user entity (UE_Q) yet,—the first base station, upon receiving a predetermined signal (UNACK_MACD_REQ (108)) from the radio network controller requesting the data structure, transmitting (41, 110) a current value of said data structure (UNACK_MACD_CNT) to the radio network controller (RNC). Also, a method for a radio network controller is provided and corresponding entities.

7 Claims, 14 Drawing Sheets

(56) References Cited

U.S. PATENT DOCUMENTS

| | | |
|---|---|---|
| 2005/0039101 A1* | 2/2005 | Torsner .......................... 714/748 |
| 2005/0111410 A1* | 5/2005 | Bazar ............................. 370/331 |
| 2007/0072612 A1* | 3/2007 | Haraguchi et al. ............ 455/436 |
| 2010/0067481 A1 | 3/2010 | Maeda |

FOREIGN PATENT DOCUMENTS

| | | | |
|---|---|---|---|
| WO | 2004042993 | A1 | 5/2004 |
| WO | 2007127950 | A1 | 11/2007 |
| WO | 2008007170 | A1 | 1/2008 |
| WO | 2008029628 | A1 | 3/2008 |

* cited by examiner

FIG. 1 – PRIOR ART

FIG. 2 – PRIOR ART – 3GPP 25.435

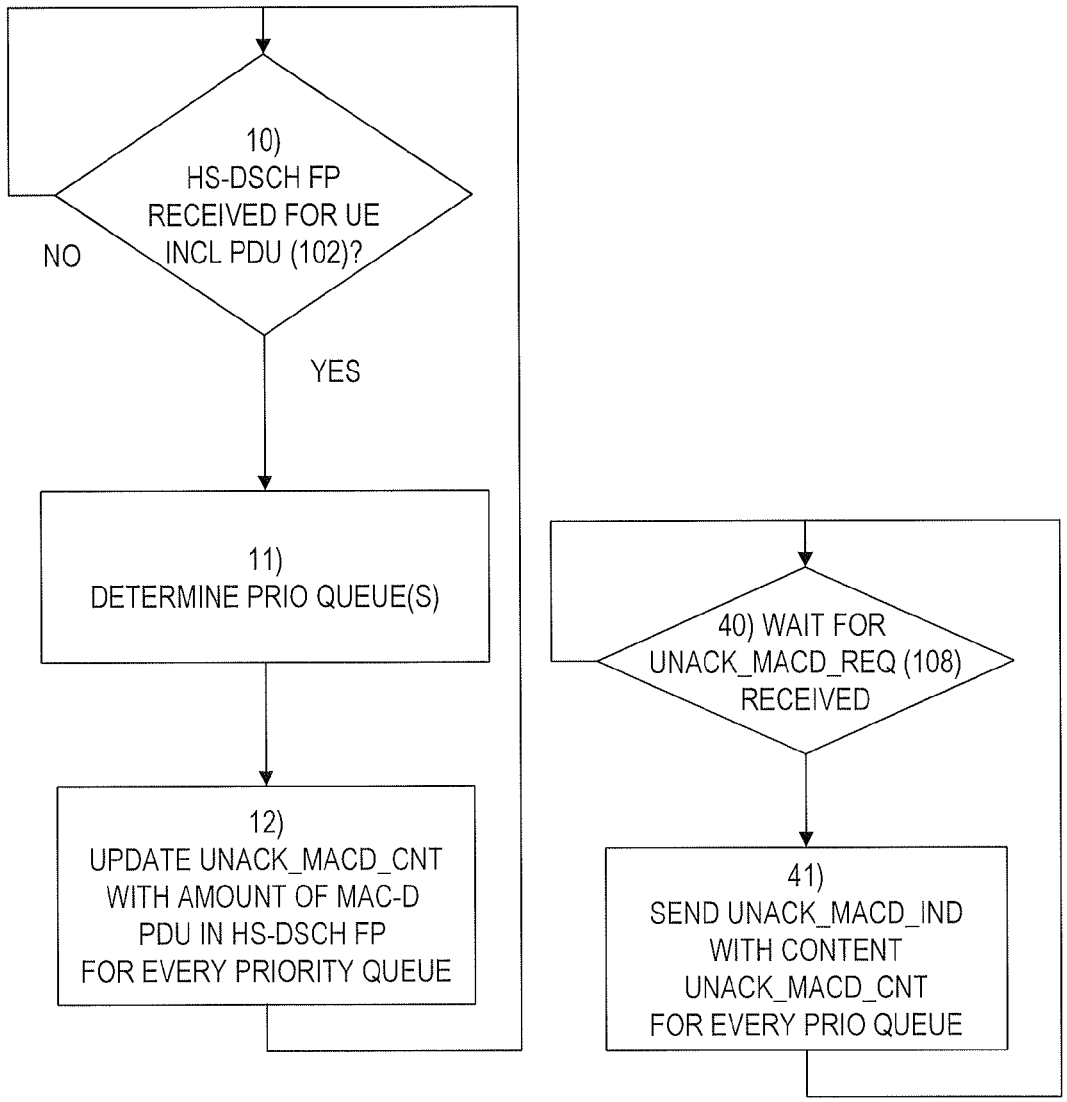

HARQ PROCESS
– Node B – EMB 1 + 2

SCHEDULING PROCESS
– Node B – EMB 1 + 2

FIG. 9 – Node B – EMB 1

FIG. 10 – Node B – EMB 2

FIG. 11 – Node B - EMB 2

FIG. 12 – RNC
TRANSMITTING MAC-D TO
NODE B

FIG. 13 – RNC
AT UE HANDOVER

FIG. 15 – RNC

APPARATUS AND METHOD FOR IMPROVED HANDOVER PERFORMANCE

CROSS-REFERENCE TO RELATED APPLICATION

This application is a 35 U.S.C. §371 National Phase Entry Application from PCT/EP2008/068363, filed Dec. 30, 2008, and designating the United States.

TECHNICAL FIELD

This invention is directed to packet data transmission during handover from various base stations. More particularly, the invention relates to the packet data according to the high speed packet data protocol HSDPA.

BACKGROUND

The RLC layer in 3GPP can operate in three modes, transparent mode, unacknowledged mode and acknowledged mode (AM), which will be focused upon in the following.

In AM mode, incorrectly received PDU's (Protocol Data Units) discovered by the receiving side are effected to be retransmitted by the transmitting side by means of an ARQ (Automatic Repeat Request) protocol.

An AM RLC entity consists of a transmitting side, and a receiving side, where the transmitting side of the AM RLC entity transmits RLC PDU's and the receiving side of the AM RLC entity receives RLC PDU's.

An AM RLC entity resides in the UE (user equipment) and in the RNC (radio network control), respectively. The transmitting side segments and/or concatenates RLC SDU's (service data units) into PDU's of a fixed length. The receiving side reassembles received PDU's into RLC SDU's and transmits these to higher data layers. Likewise, SDU's are received from the layer above the RLC layer. In AM mode, the RLC layer is responsible for the delivery of SDU's in consecutive order.

In FIG. 4 of document WO2005/034418, an implementation of the acknowledged mode (AM) UE (base station)/UTRAN (Radio access node/base station (Node B)) entity is shown.

To facilitate the in-sequence delivery, each RLC PDU is given a sequence number, 0-4095, whereby the transmitter transmits PDU's with increasing sequence number modulo 4096. Using the sequence number, the receiver can detect a missing PDU. The receiver can be configured to transmit a STATUS message upon the detection of a missing PDU. The STATUS report may contain positive or negative acknowledgement of individual RLC PDU's received by the peer RLC entity. The transmitter can also request a STATUS messages from the receiver by setting a Poll flag in the PDU header. The conditions for that the transmitter sets the Poll flag are among others:

Last PDU in buffer. When only one PDU exists in the input buffer, the poll flag is set.
Poll timer expires. When a parameter timer_poll expires, that is, the transmitter requested a STATUS earlier and initiated a timer_poll to reassure that a response is received.
Window based. A transmitter is restricted in the amount of "outstanding data" it can transmit until a STATUS confirms the reception to the receiving side. "Outstanding data" relates to the earliest unacknowledged PDU.

Note that the above description of the functionality of the RLC layer only constitutes a small excerpt of those features actually provided.

Selective retransmissions are possible, e.g. if STATUS message indicates PDU with sequence number (SN) 3, 6 and 13 are missing, only 3, 6 and 13 needs to be retransmitted.

To recover from erroneous conditions when MAC-hs PDU's are missing, various stall avoidance mechanisms as described in 3GPP TS 25.321-11.6.2 (re-ordering release timer and window based stall avoidance) are used.

Handover

In HSDPA there exists only one Node-B at a time which transmits data to the UE. The Node-B will buffer received MAC-d PDU's from the RNC and an internal scheduler will determine when to transmit these MAC-d PDU's in MAC-hs PDU's to the UE. The UE will receive data at its MAC-hs receiver and deliver data to corresponding higher layer applications.

At a time of a handover between one Node-B and another Node-B, there may exist MAC-d PDU's which have been sent from the RNC RLC layer but which have not been received at the UE RLC layer yet. This may be due to one or more of the following circumstances:

MAC-d PDU's transmitted from the RNC RLC layer are pending (or buffered) in Node-B and have subsequently not been transmitted from Node-B yet;
MAC-d PDU's transmitted from the RNC RLC layer may have been sent from Node-B (as MAC-hs packet data units) but have not been properly received at the UE yet; or
MAC-d PDU's transmitted from the RNC RLC layer may have been properly received at the UE (as MAC-hs packet data units) but due to the MAC-hs protocol reordering mechanism, these PDU's have not been delivered to the UE RLC layer yet.

In the following, we shall briefly refer to the above three situations as MAC-d PDU's having been discarded in Node B.

If a handover occurs, the MAC-d PDU's described above will be deleted (or lost), and the RLC layer of the RNC will have to retransmit the data in order to avoid loss of e.g. TCP data.

In prior art document 'System for efficient recovery of Node B buffered data following serving high speed downlink shared channel cell change', US 2004/0165554, it is described how a UE experiencing a cell change sends a PDU STATUS message autonomously to the RNC, whereby the RNC more rapidly can retransmit MAC-d PDU's that have not been received at the UE.

A new Medium Access Control entity MAC-ehs has been introduced in 3GPP rel 7. MAC-ehs can be used alternatively for MAC-hs. MAC-ehs supports flexible RLC MAC-d PDU sizes as well as MAC segmentation/reassembly. Furthermore, unlike MAC-hs for HSDPA, MAC-ehs allows to multiplex data from several priority queues within one transmission time interval of 2 ms.

In the invention descriptions is made referring to MAC-hs unless specifically mentioned. It will however be appreciated that MAC-ehs can be used similarly.

For further information about HSDPA see: http://www.ericsson.com/solutions/tems/articles/Q4_2005_High_Speed_Downlink_Packet_Access_part1.pdf For information about MAC-ehs see: http://www.ericsson.com/ericsson/corpinfo/publications/review/2008_01/files/5_HSPA_Evolution.pdf For information about EUL see: http://www.ericsson.com/technology/research_papers/wireless_access/doc/wcdma_enhanced_uplink_principles_and_basic.pdf All documents being publicly available on the official Ericsson web site www.ericsson.com on 20081230.

The following picture shows the signalling between the RNC and Node-B at cell change:

Problems With Existing Solutions

In prior art document US 2004/0165554 (see section [0011]), a description is first made of the known prior art mechanism, which is following the HS-DSCH cell change:
1) the RNC can explicitly request a status PDU from the UE); or
2) the RNC can just start transmitting where it stopped in the source cell and out-of-sequence delivery realized by the UE will generate the status PDU.

As described in US 2004/0165554, the recovery can be considerably delayed and it is noted that delays and delay jitter are negative for end user TCP performance. Prior art US 2004/0165554 further continues proposing a mechanism to mitigate the negative effects on end-user throughput, caused by the recovery due to delays and delay jitter, where the UE upon a cell change autonomously transmits a Status PDU to the serving RNC. At the reception of the Status PDU, the RNC will discover which data that is lost and perform the retransmission faster than for 1) and 2) above.

Let us now focus on the delivery time for the autonomous Status PDU and compare this against the total time it takes until the UE receives the missing PDU's. Let us first start to estimate the delay until it takes to transmit the Status PDU to the RNC. We assume that the user is using HS-DSCH for downlink transmissions and E-DCH for the uplink:

Case 1—An EUL grant exist for the UE (best case)
(Assume an E-DCH configuration with TTI=10 ms)

First we assume that the waiting time from that the Status PDU, generated from the RLC layer at the UE, is received at the UE EUL layer until it is transmitted in the E-DPDCH TTI is 5 ms. I.e. half the TTI interval.

Transmission time is equal to the TTI period, 10 ms.

Propagation delay is considered to be low compared to the other time delay component. Decoding time at Node-B until transmitted at the Iub interface between 5-10 ms. Total delay until transmission on Iub is estimated to be between 20-25 ms.

Case 2—No EUL Grant Exists for the UE (Worst Case)

When EUL entity in the UE receives the Status PDU, generated from the RLC layer at the UE, the UE has to signal up to the Node B that a transmission is required, e.g. to transmit unhappy on E-DPCCH, in order to force Node B to grant a transmission for the UE via AGCH.

FIG. 3 illustrates the problem:
1) Data is received from the RLC layer (i.e. Status PDU)
2) A scheduling information is sent as part of the MAC-e header.
3) The scheduler in Node-B receives the scheduling information.
4) A Grant is sent to the UE, signalling the ability to transmit.

A rough estimate gives that steps 1)-4) will take in the range between 30-100 ms, for a configuration with TTI=10 ms.

If we now compare case 1 and case 2 delays with the remaining delay components:
a) The transmission of the Status PDU up to the RNC's RLC layer on Iub.
b) The reaction time for RNC's RLC layer to retransmit MAC-d PDU's
c) Delivery time to Node-B on Iub for the retransmitted PDU's.
d) Waiting time in Node-B until first transmission occurs on MAC-hs.
e) Data reception on MAC-hs UE and transmission from UE MAC-hs layer to RLC layer
  a) and c)is assumed to be small in the range <1 ms or <<1 ms.
  b) depends upon the load in the RNC, but an estimate is approx 1 ms.
  d) is assumed to be in the range 3-5 ms.
  e) if we assume that the retransmitted MAC-d PDU's all fit into one MAC-hs PDU and that first transmission are successful, then the additional delay is assumed to be in the range 0.5 to 3 ms. If a retransmission is needed, then the delay will be in the range 12.5-15 ms. If a 2nd retransmission is needed: 24.5-27 ms.

All in all the remaining delay is assumed to be:
No Node-B retransmission: 6-10 ms.
1 Node-B retransmission: 18-22 ms.
2 Node-B retransmissions: 30-34 ms.

All in all, we can conclude that the initial delay estimation—either 20-25 (case 1) or 30-100 ms (case 2)—above can be considerably longer than the remaining delay above, or at least comparable with the remaining delay.

SUMMARY

It is a first object of the invention to mitigate the negative effects associated with discarded packet data units that will arise when a user entity is involved in receiving data via performs handover between base stations.

According to a first aspect of the invention, there is provided a method in a first base (Node_B_S) station that is adapted to receive media access control layer packet data units (MAC-d; PDU 101, 102, 104, 105) from a radio network controller (RNC) relating to at least a traffic flow relating to a given user entity (UE_Q) and forwarding (MAC-hs/MAC-ehs) such packet data units to said user entity.

The transmission to the given user entity is adapted to be potentially handed over to at least a second radio base station (Node B_T), the method being characterized in the following steps:
  the first base station (Node_B_S) continuously updating (12, 33, 335, 41) at least a data structure (UNACK_MACD_CNT) relating to media access control layer packet data units (MAC-d PDU's) of a priority queue of the user entity, which packet data units are recently transmitted from a protocol layer (RLC) in the radio network controller (RNC RLC) whereby at least some of said packet data units may not be received by a corresponding protocol layer (RLC) in the user entity (UE_Q) yet,
  the first base station, upon receiving a predetermined signal (UNACK_MACD_REQ (108)) from the radio network controller requesting the data structure, is transmitting (41, 110) a current value of said data structure (UNACK_MACD_CNT) to the radio network controller (RNC).

According to the second aspect of the invention there is provided a base (Node_B_S) station adapted to receive media access control layer packet data units (MAC-d; PDU 101, 102, 104, 105) from a radio network controller (RNC) relating to at least a traffic flow relating to a given user entity (UE_Q) and forwarding (MAC-hs/MAC-ehs) such packet data units to said user entity.

The transmission to the given user entity is adapted to be potentially handed over to at least a second radio base station (Node B_T), the method being characterized in the following steps:

the first base station (Node_B_S) continuously updating (12, 33, 335, 41) at least a data structure (UNACK_MACD_CNT) relating to media access control layer packet data units (MAC-d PDU's) of a priority queue of the user entity, which packet data units are recently transmitted from a protocol layer (RLC) in the radio network controller (RNC RLC) whereby at least some of said packet data units may not be received by a corresponding protocol layer (RLC) in the user entity (UE_Q) yet, the first base station, upon receiving a predetermined signal (UNACK_MACD_REQ (108)) from the radio network controller requesting the data structure, transmitting (41, 110) a current value of said data structure (UNACK_MACD_CNT) to the radio network controller (RNC).

By using this new signalling at cell change situations, the RNC can estimate which MAC-d PDU's a Node-B failed to deliver and can immediately start to retransmit this data to a new Node-B, to which the user entity is handed over. Thereby, the downloading rate during cell change can be improved.

Further advantages of the invention will appear from the following detailed description of the invention.

BRIEF DESCRIPTION OF THE DRAWINGS

FIG. 5-9 show flow diagrams relating to first embodiment of a Node B according to the invention, FIG. 10-11 disclose flow diagrams relating to a second embodiment of a Node B according to the invention.

DETAILED DESCRIPTION OF PREFERRED EMBODIMENTS OF THE INVENTION

According to a first aspect of the invention, special method steps are undertaken in a first base station also denoted Node B, and a radio network controller with the aim of preparing a second base station for handover, such that the effective bit rate is not substantially disadvantaged due to the handover. In the following, the first base station in this situation shall be referred to as a source base station, while the second base station shall be referred to as a target base station.

Regarding the base station, Node-B, the amount of stored and unacknowledged MAC-d PDU's per MAC-d flow are calculated. Upon a request from the RNC, or autonomously, or as a consequence of some other handling, Node B transmits the calculated amount of unacknowledged MAC-d PDU's up to the serving RNC in a new or existing signal. Regarding the serving radio network controller, RNC, steps are undertaken to create and maintain an updatable sequence number bitmap, SNB, according to the invention, representing a plurality of recently transmitted MAC-d PDU sequence numbers. In this context, recently transmitted MAC-d PDU's may refer both to MAC-d PDU's which are sent for the first time as well as retransmitted MAC-d PDU's. The RNC continuously updates the sequence number bitmap.

According to one embodiment of the invention, upon reception of a predetermined signal, the RNC shall investigate the sequence number bitmap, SNB, to determine which sequence number(s) that have been discarded in the source Node-B. The RNC shall then retransmit the corresponding MAC-d PDU's to the target Node-B, to which the UE will be handed over.

With the use of the sequence number bitmap, Node-B only needs to maintain knowledge about the current amount of discarded MAC-d PDU's, since the RNC will be able to uniquely match each discarded MAC-d PDU with a corresponding SN using the sequence number bitmap.

Thereby, the recovery time is improved over what is given by the prior art behaviour.

Figure 1:
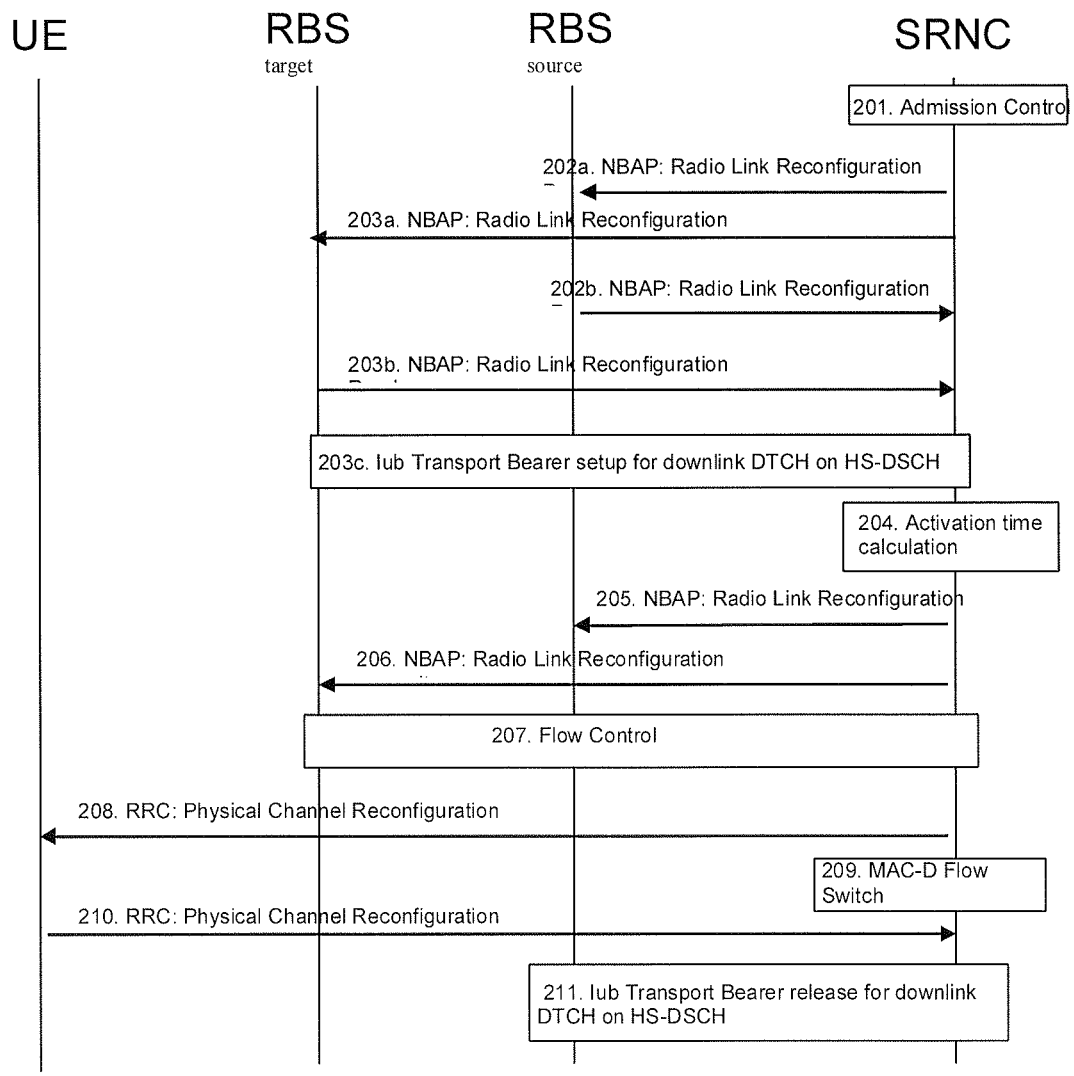
FIG. 1 shows basic elements of a prior art HSDPA network and handover signalling.

In FIG. 1, an exemplary handshake diagram is provided which shows the signalling between a radio network controller, a Node B and a user entity (UE), wherein handover is performed from a first base station (source) to a second base station (target). This diagram shall be dealt with more in detail in the following, but first the behaviour of a base station and the radio network controller according to preferred embodiments of the invention shall be explained.

Node-B Behaviour:

Node B stores incoming data in unique MAC-d buffers per MAC-d flow. Since the content of the MAC-d PDU represent information conveyed between layers present in the RNC and in the UE, decoding of MAC-d PDU is not done Instead, Node-B utilises the amount and size of the stored MAC-d PDU's in the scheduler. MAC-d PDU's from each buffer is sent in ascending order, i.e. first in first out. As is known, Node-B utilizes up to 8 HARQ processes in its communication with an UE.

Each HARQ processes will transmit a MAC-hs PDU with its unique MAC-hs TSN.

The transmit sequence number, TSN, is represented by a 6 bit value [0 . . . 63]. TSN is used in order to reassure that the prescribed in-sequence MAC-d delivery is maintained, e.g. first received MAC-d PDU from RLC layer at the RNC shall be the first delivered MAC-d PDU to the UE RLC layer.

3GPP does not specify the exact behaviour of the Node-B transmitter, but Node B must operate in correspondence with the mandatory parts of the 3GPP specification for the UE receiver.

The Node B according to the invention has, like standard prior art Node-B's, knowledge about the earliest sent unacknowledged MAC-hs PDU, e.g. the 'lowest' TSN (taking into account that the TSN is counted modulo 64). For the present embodiments of the invention, reference is also made to the 'lowest' TSN as the Bottom Of Window (BOW).

According to one aspect of the invention, Node-B according to the invention calculates a data structure, UNACK_MACD_CNT, concerning the amount of MAC-d PDU's stored in a MAC-d flow buffer, and all MAC-d PDU's transmitted in MAC-hs PDU up to and including the earliest sent unacknowledged MAC-hs PDU in the Node B in question. The Node B according to the invention is adapted to communicate this data structure to the RNC, from which the Node B receives downlink data for a given flow for a given user entity. It will be appreciated that the BOW is continuously updated when feedback (HSDPCCH) discloses a successful reception at the UE (ACK) or at an exceptional handling where the BOW is forwarded due to a maximum number of retransmitted MAC-hs PDU's for a specific HARQ process, or due to excessive time delay or due to a combination thereof.

For MAC-ehs, where a MAC-d PDU can be split such that a first part of a MAC-d is sent in a first MAC-ehs and the second (last) part of the MAC-d is sent in a subsequent MAC-ehs, only the latter shall preferably contribute to UNACK_MACD_CNT according to the invention, e.g. all other MAC-ehs stemming from the splitted MAC-d PDU shall add 0 to UNACK_MACD_CNT.

For the case where a MAC-ehs PDU comprises MAC-d's from more than one priority queue, the HARQ process will in this case (step 22) store the number of MAC-d PDU's and the corresponding priority queue-id for each priority queue that is present in the MAC-ehs together with the transmit sequence number.

Moreover, when the HARQ process is completed (step 24) the amount of MAC-d PDU's and corresponding priority queue-id for each priority queue together with the transmit sequence number are reported back to the scheduler.

Moreover in step 33, 335 and 334 each included priority queue and corresponding num of MAC-d are served.

RNC Behaviour

According to the invention, the RNC is assisting base stations such as to render handover faster.

For this purpose, the radio network controller RNC maintains at least one data structure, as previously discussed, denoted sequence number bitmap (SNB), for a given "source" base station, NODE_B_S which preferably is constituted as a bitmap corresponding to the sequence numbers, SN, of recently sent MAC-d PDU sequence numbers destined to a specific priority queue at a specific UE to the particular base station (NODE_B_S).

The RNC may hold a plurality of SNB's depending on the number of priority queues for the UE, number of UE's, and number of base stations.

The length of the sequence bitmap is configurable.

Retransmissions to a specific priority queue for a specific UE which is handed over to a target base station, NODE_B_T, are performed according to indications of the bitmap.

The sequence number bitmap relating to the source base station is used as a basis for performing retransmissions at handover or a modified sequence number bitmap, denoted SNB_T, is used.

Figure 4:
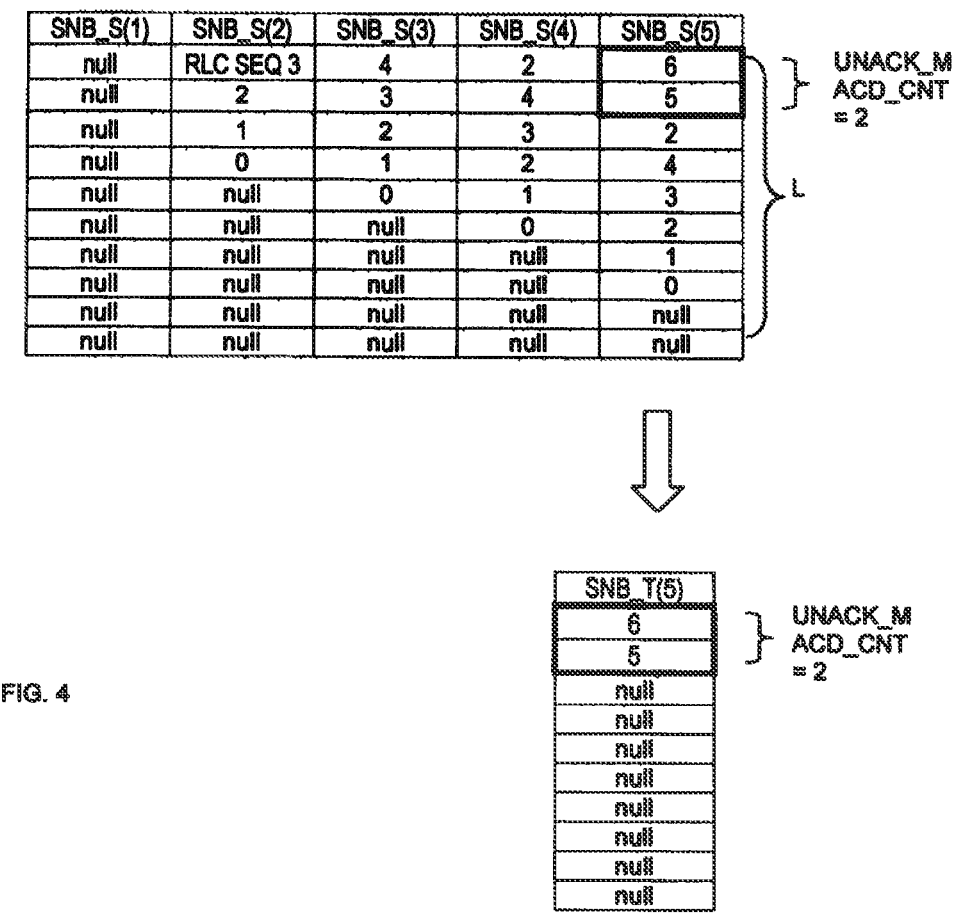
FIG. 4 shows a sequence number bitmap held at the radio network controller according to preferred embodiments of the invention.

In the latter case, shown in FIG. 4, the modified sequence number bitmap is derived from the source base station sequence number bitmap, SNB_S.

The sequence number bitmap may have a given "maximum length", L, thereby limiting the amount of retransmissions to a suitable value.

Node B—RNC Interaction

In the following, a first embodiment of the invention is described with reference to FIGS. 3 and 4.

According to a first embodiment of the invention, a modified bitmap, denoted SNB_T, is used.

The modified bitmap is modified from the bitmap associated with the source base station, by a procedure wherein the effective length of the bitmap, i.e. the amount of last transmitted sequence numbers is limited to a value of a data structure as indicated by the source radio base station, denoted UNACK_MACD_CNT, which value should be less than the maximum length L.

The modified bitmap is established at the RNC for the target base station to which the UE is handed over. The bitmap for the target base station SNB_T is created by copying a number of top RLC entries corresponding to the amount indicated by the UNACK_MACD_CNT value. The remaining entries of the modified bitmap are constituted by null values.

At the time of a cell change for a UE, the RNC stops transmitting MAC-d data to the source Node-B, and sends a UNACK_MACD_REQ 108 to the source Node-B, Node_B_S.

At the reception of a signal UNACK_MACD_IND 110 with content UNACK_MACD_CNT, the RNC modifies the sequence bit map, and retransmits a number of MAC-d PDU's in the bitmap corresponding to the UNACK_MACD_CNT number starting from the Last sent SN in the sequence number bitmap, SNB. The RNC shall retransmit these MAC-d to the target Node-B; Node_B_T.

Note that the value of UNACK_MACD_CNT represents a pessimistic view of the receiving status at the UE, since some MAC-d PDU's may have been delivered to the RLC layer due to the exceptional handling of the UE, described earlier, but it is the price that has to be paid since Node-B can never predict the exact status of the UE receiver. In typical cases, UNACK_MACD_CNT will reflect the amount of stored MAC-d PDU's which are pending due to a congestion situation when other UE's are scheduled.

Figure 3:
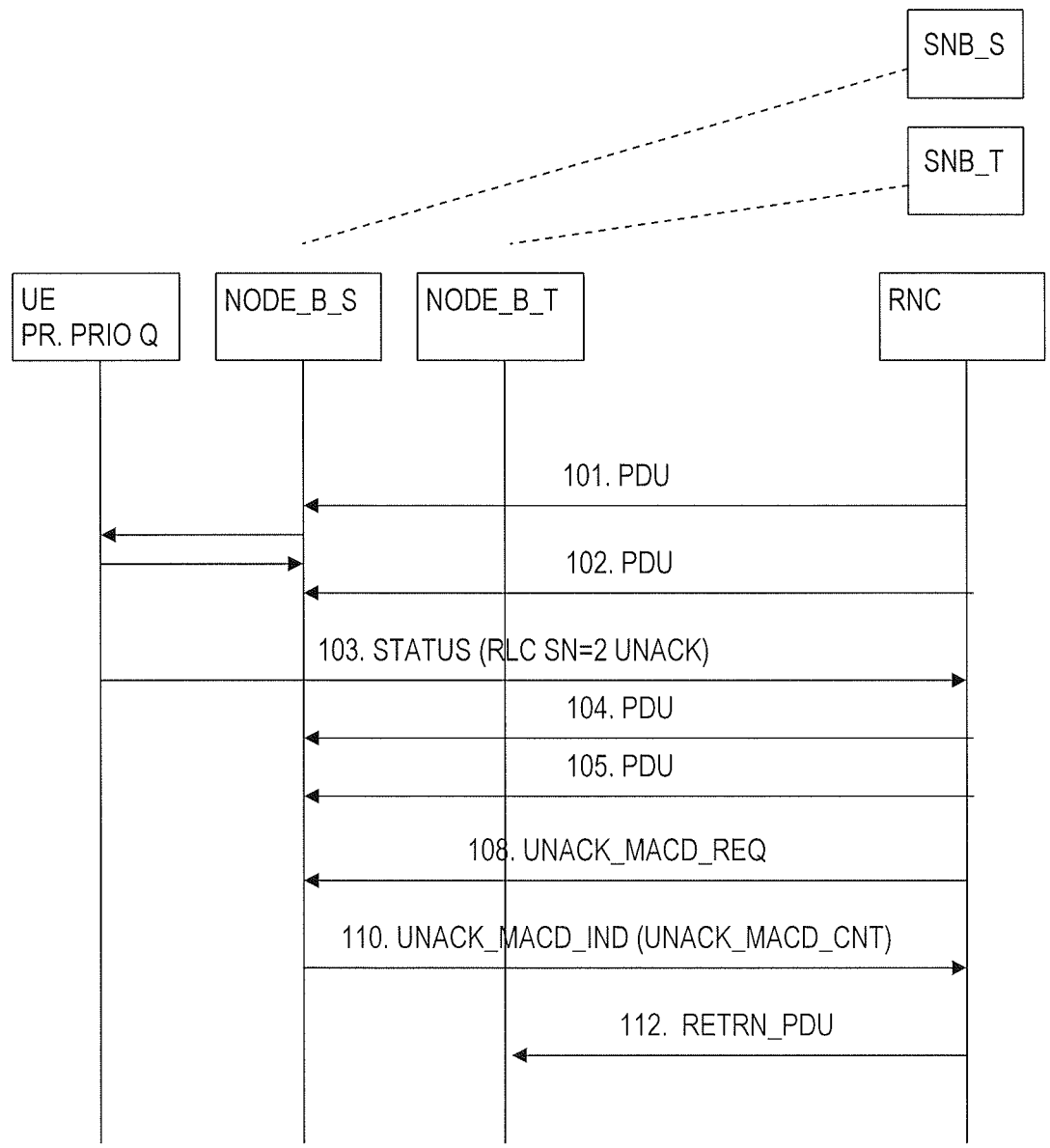
FIG. 3 shows a handshake diagram of a preferred embodiment of the invention.

In the following, an example relating to the first embodiment shall be given, referring to FIGS. 3 and 4, showing various sequence number bitmaps SNB_S, SNB_T containing a list of RLC sequence numbers at different point in times. The first bitmap SNB_S pertains to the source base station while a second bitmap pertains to a potential target base station, to which a UE, or more precisely, a given priority queue for a given UE, is going to be handed over from the source base station.

The example shows one priority queue, but it should be appreciated that the handling is applicable to all priority queues of the UE.

1. Assume, at time 1, c.f. FIG. 4 SNB_S(1), no data exists in the RLC transmit buffer at the RNC. Neither buffered (waiting for transmission), nor transmitted RLC packets waiting for acknowledgement for one existing UE in the radio network. The bitmap shown as SNB_S(1) initially contains only null values. In the present example the bitmap is limited to 10, but this value could be of any arbitrary length. For instance, a practical value under the RLC numbering structure is, e.g. 2048.

2. At time 2, a HS_DSCH frame, denoted 101 in FIG. 3 is transmitted by the RNC containing four MAC-d with RLC sequence numbers 0, 1, 2, 3, as shown in SNB_S(2). The bitmap SNB_S is outlined as a stack which is filled from the top such that a last sent sequence number appear at the top while the contents of the stack moves downwards and the bottom of the stack is deleted.

3. At time 3, a second HS-DSCH PDU frame 102 is transmitted from the RNC with RLC sequence number 4, which appears at the top of the bitmap, as illustrated in SNB_S(3).

4. At time 4, a STATUS PDU 103 message is received from a UE indicating that MAC-d with sequence number 2 is missing at the UE.

5. The RNC retransmits a MAC-d with RLC sequence number 2 in a new HS_DSCH frame 104. RLC sequence number 2 appears at the top of the bitmap while the content of the bitmap is moved downwards, see SNB_S(4).

6. At time 6, the RNC transmits 2 MAC-d PDU to the source Node-B with MAC-d sequence number 5 and 6 in one single HS-DSCH frame protocol 105.

7. At time 7, the RNC transmits a UNACK_MACKD_REQ 108 to the source base station as one step in the handover procedure to replace the existing base station (source node B) through which the RNC communicates with the UE to a new target base station (target node B) It is noted, that the decision to perform a HS-DSCH handover is based on measurements from the UE of neighbouring cells to the serving cell.
8. The Source Node-B responds by issuing a UNACK_MACD_IND 110 with UNACK_MACD_CNT=2, indicating that two MAC-d's remains to be transmitted from the source base station or remains to be acknowledged by the UE.
9. A modified bitmap is established at the RNC for the target base station to which the UE is handed over. The bitmap for the target base station SNB_T is created by copying a number of top RLC entries corresponding to the amount indicated by the UNACK_MACD_CNT value, which in the present example is two. The remaining entries of the bitmap are null values, see SNB_T(5).
10. A HS_DSCH frame 112 containing RLC sequence numbers 5 and 6 is transmitted towards the target base station.

Node B—Internal Workings

In FIGS. 5-9 the internal procedure of an exemplary base station according to the first embodiment of the invention is shown in more detail. It should be understood that the procedures shown in FIGS. 5-9 run in parallel.

In FIG. 5, in step 10, Node B awaits reception of a HS-DSCH for a given UE for a given priority queue, which in this document also is referred to as a traffic flow.

In step 11, Node B checks for which priority queue the traffic should be distributed.

In step 12, the Node B updates the data structure UNACK_MACD_CNT with the amount of MAC-d packet data units, PDU, in the HS-DSCH frame protocol for the given priority queue. Subsequently the routine goes to step 10)

In parallel herewith, the routine shown in FIG. 6, comprising steps 40-41, Node B waits for an UNACK_MACD_REQ signal from a RNC. If such signal is received, the routine goes to step 41, according to which Node B transmits an UNACK_MACD_IND signal with the content of the data structure UNACK_MACD_CNT for a given use entity and priority queue.

Figures 7, 8:
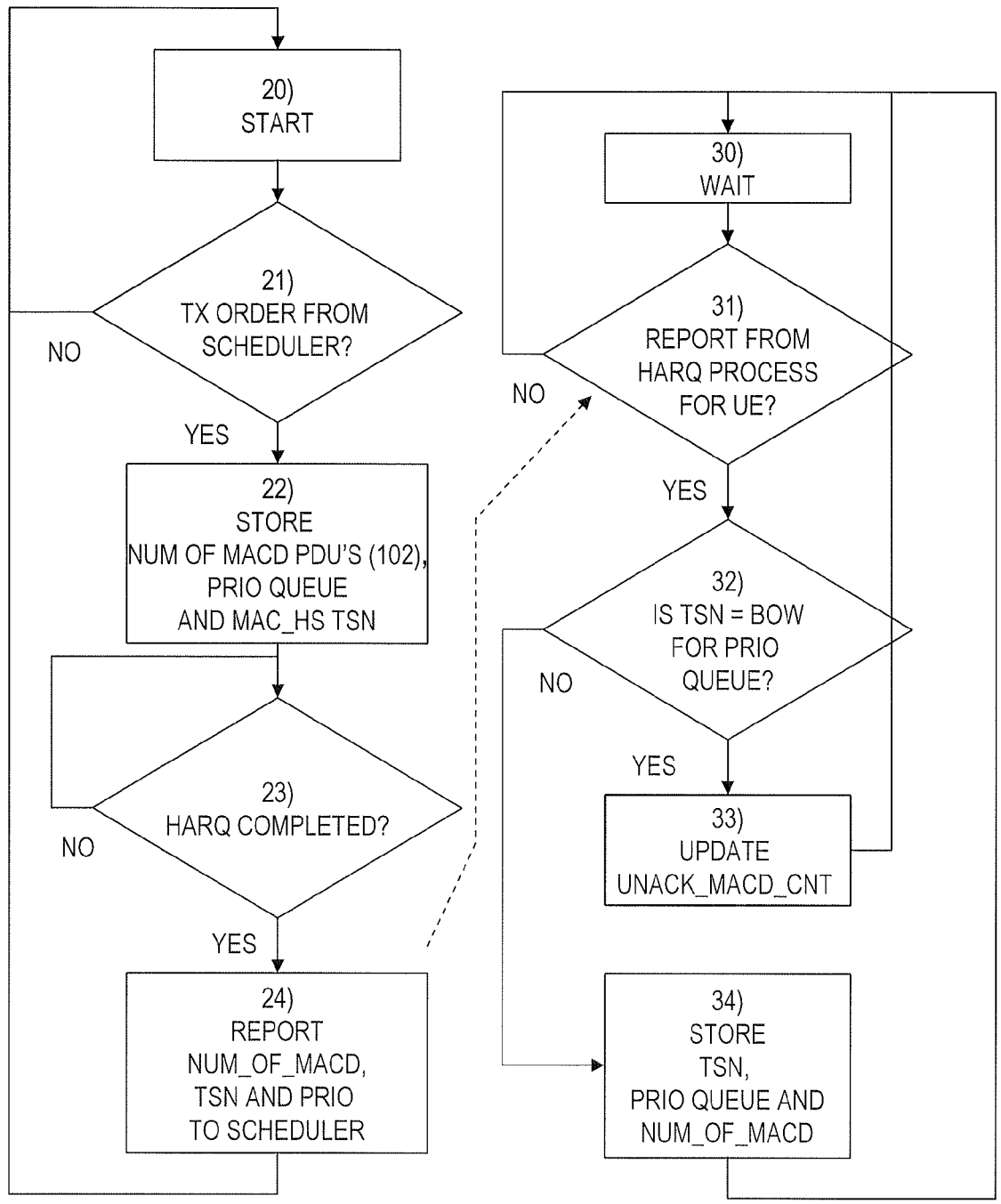

In FIG. 7, a further routine is performed showing the behaviour of the HARQ process. In step 20 the routine is started and in step 21 it is tested whether a transmit order is given by the scheduler of Node B. If no go to step 20, if yes proceed to step 22, in which the number of MAC-d PDU's, priority queue id and MAC-hs transmit sequence number, TSN, is stored.

When the corresponding HARQ process is completed, step 23, the amount of MAC-d PDU's, the transmit sequence numbers, and priority queue information is reported back to the scheduler in step 24.

A HARQ process is completed either at the reception of a feedback representing a successful reception at the UE (i.e. ACK) or at an exceptional handling where the HARQ procedure is unsuccessful and fails to receive an ACK, which may occur at configurable maximum number of retransmissions, or a configurable maximum time measured from first transmission of the MAC-hs data or at a combination thereof.

The scheduling routine, shown in FIG. 8, in step 30, a waiting instruction is performed that awaits the completion of HARQ processes for the given UE. If such reporting is received, it is examined whether the transmit sequence number is equal to bottom of window BOW for the priority queue. If yes proceed to step 33, if no proceed to step 34. Note that in this embodiment we do not take into account whether a HARQ process is successful or not successful.

Figure 9:
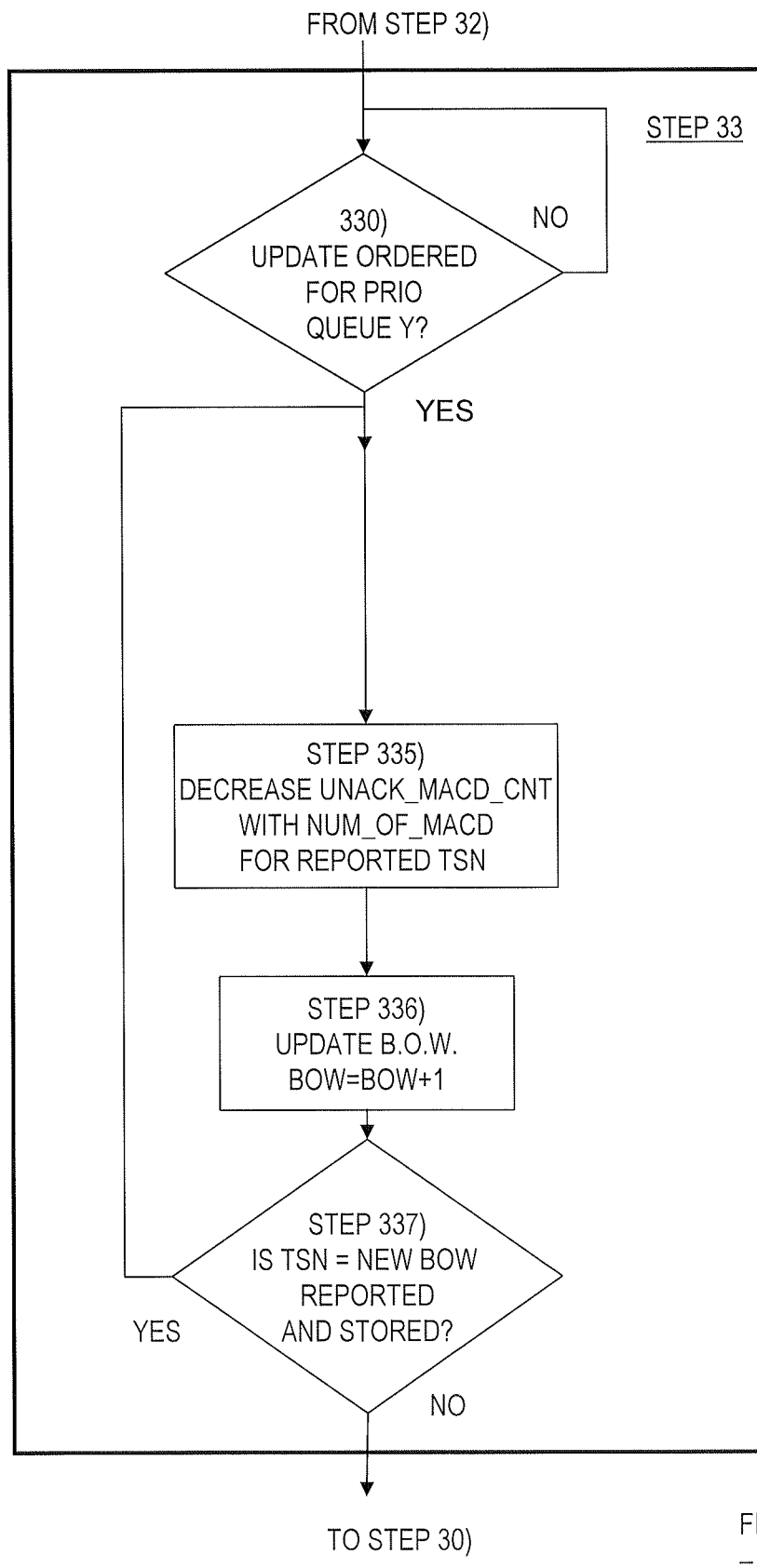

In step 33, the data structure UNACK_MACD_CNT is updated. More specifically, as shown in FIG. 9, showing a first embodiment, the MAC-d data structure is decreased according to step 335) with a number of MAC-d PDU's reported from the reported HARQ process. In step 336, the BOW is incremented with 1 and in step 337 it is tested whether the new BOW transmit sequence number is reported and stored, if yes proceed to step 335, and if no proceed to step 30

In step 34, the transmit sequence number, priority queue and number of MAC-d PDU's is stored.

Figure 10:
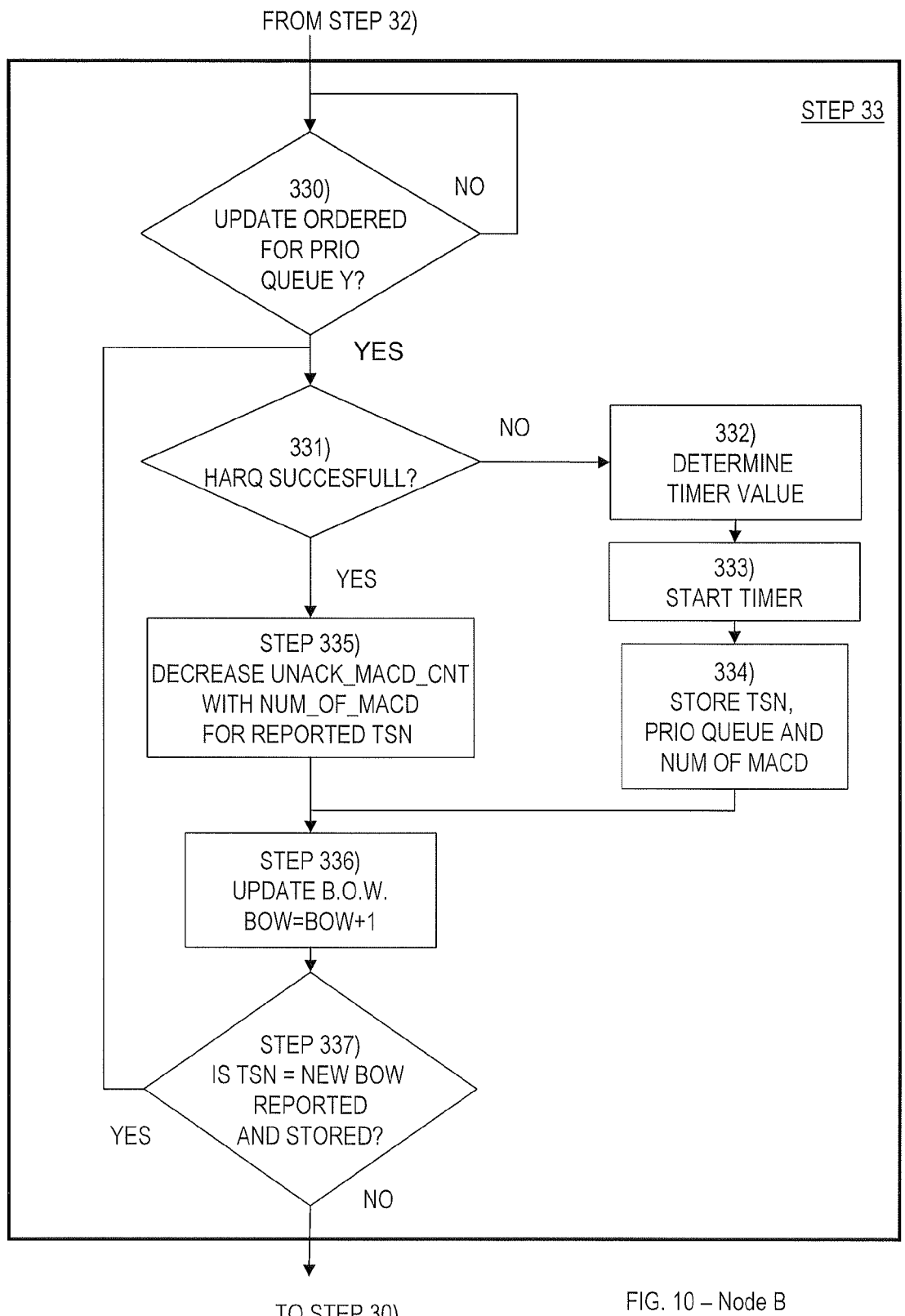

Another, embodiment for step 33 is given in FIG. 10.

Here, steps 330, 335, 336, and 337 are equal with the routine shown in FIG. 9.

However, if the HARQ process for some reasons has an unsuccessful result, a timeout function is implemented In step 331, Node-B determines whether the HARQ process was successful or not.

In 332, Node B determines, if the answer in step 331 was NO—a proper time out value T. Advantageously, the reporting time for the HARQ process is compared against the current time, e.g. T=timer offset value−(current time−reported time)

In step 333, the timer is started.

In step 334, Node-B stores information for the transmit sequence number, TSN, priority queue id and number of MAC-d PDU's.

Figure 11:
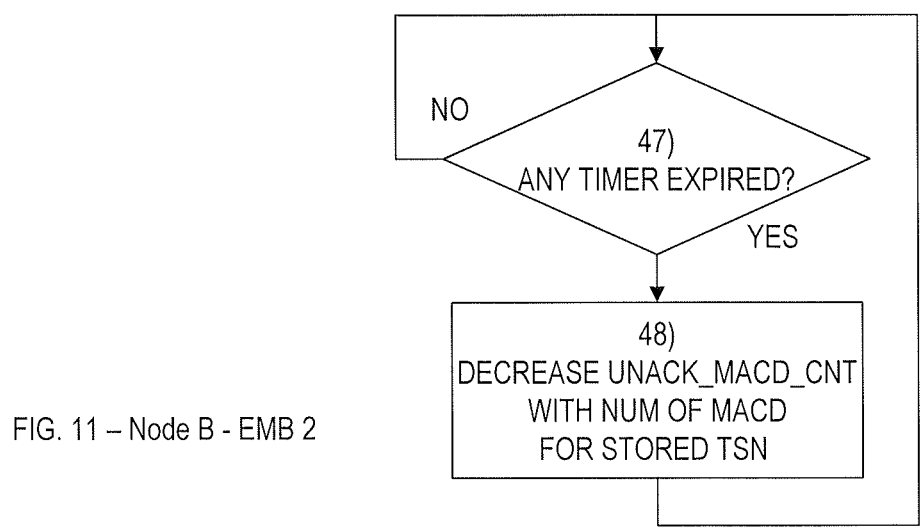

FIG. 11, shows a further routine used in connection with the second embodiment.

In step 47, it is examined whether the timer has expired. If this is the case the data structure UNACK_MACD_CNT is decreased with the number of MAC-d PDU's for the stored transmit sequence number.

RNC—Internal Workings

Figure 12:
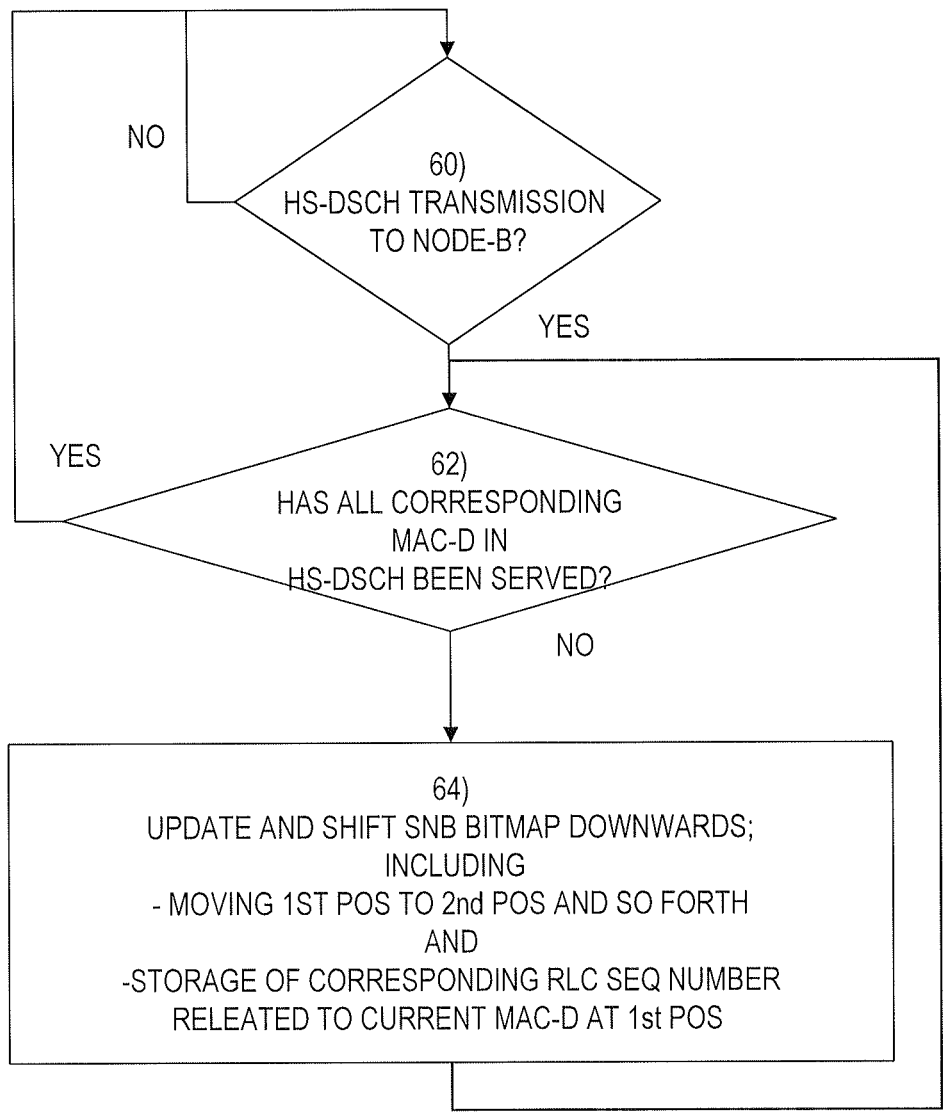
FIGS. 12-14 show flow diagrams relating to a radio network controller according to the invention.
Figure 13:
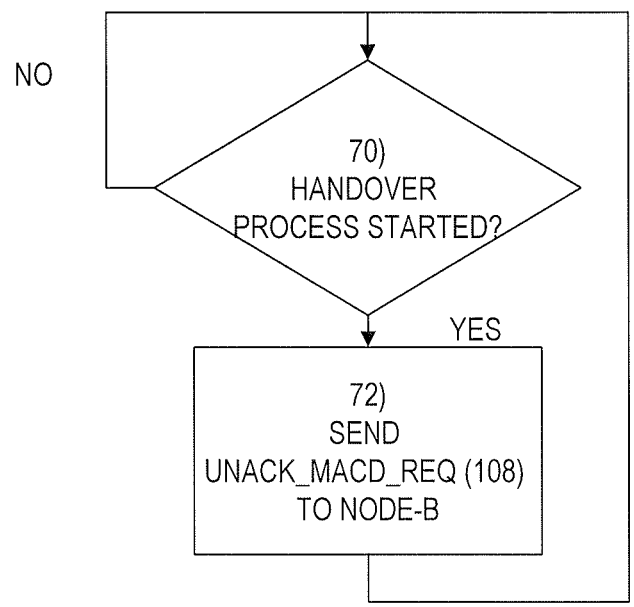
Figure 14:
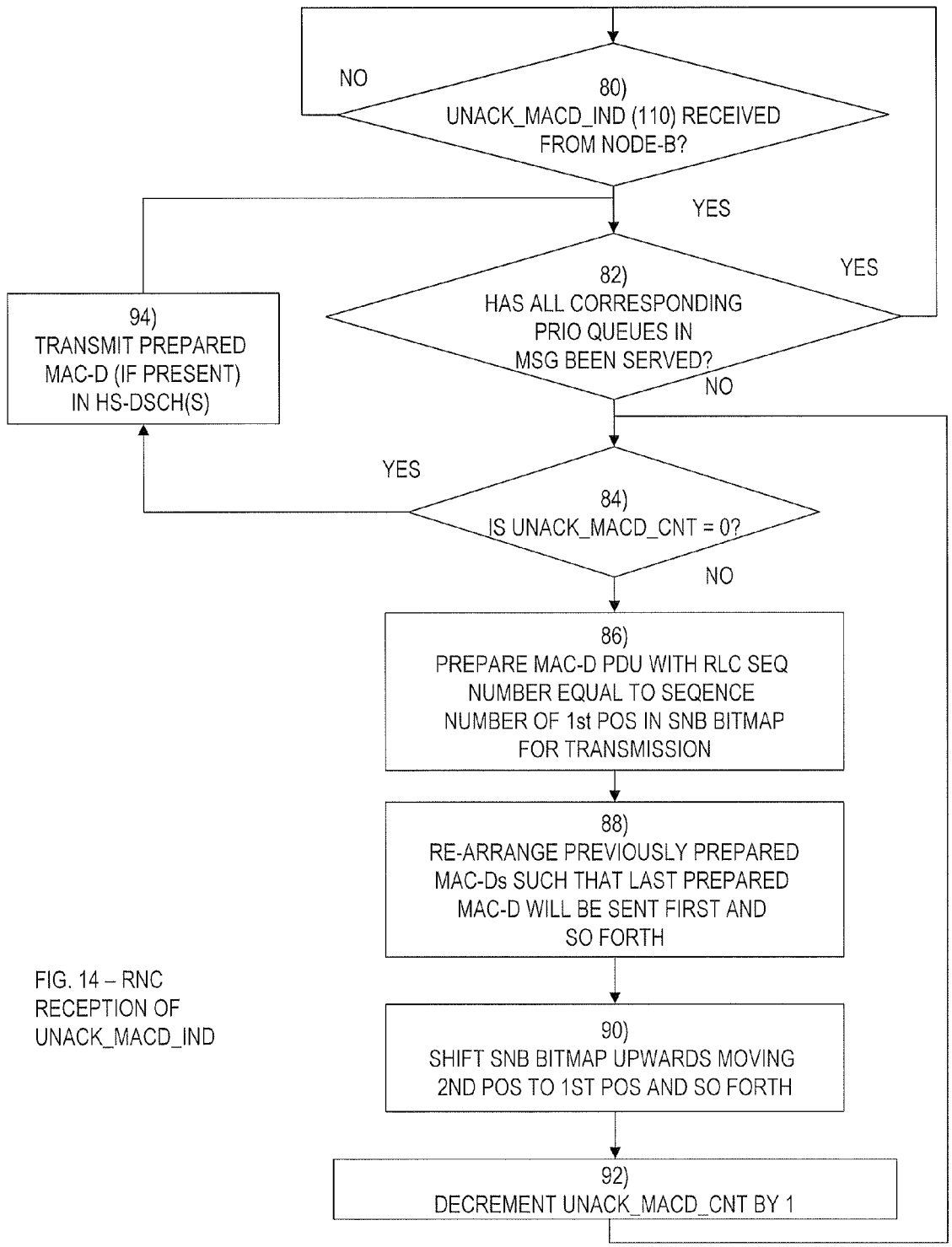

In FIGS. 12-14, the internal procedure of an exemplary RNC according to the first embodiment of the invention is shown in more detail.

In FIG. 12 a first routine of the RNC according to the invention is shown. In step 60, the RNC waits until a HS-DSCH frame is sent.

In step 62, a check is made as to whether all MAC-d in the HS-DSCH has been served. If yes proceed to step 60, if no proceed to step 64.

A first MAC-d in the HS-DSCH is served in step 64, whereby the SN Bitmap is moved downward by moving the RLC sequence number data from a 1st position to a 2nd position and so forth, as illustrated in FIG. 4. Thus, the entire content of the bitmap is moved one step down. The corresponding RLC sequence number of the current MAC-d is stored in the 1st position.

Thereby, the first position in the sequence number bitmap represents the earliest or the last data sent. The 2nd pos represent next earliest and so forth. The last position of the bitmap is flushed upon storage of new data.

It is noted that the RNC holds one SN transmit bitmap per priority queue of the UE.

In FIG. 13, a further procedure for the RNC at handover is given.

In step 70, a check is made as to whether a handover has been decided. If this is the case, in step 72, the RNC sends an UNACK_MACD_REQ to NODE-B 108 for the UE in question.

In FIG. 14, a further RNC procedure according to the invention is shown.

In step 80, an UNACK_MACD_IND 110 signal from a NODE-B is awaited.

In step 82, the RNC analyzes responses for all priority queues.

In step 84, a check is made if UNACK_MACD_CNT is =0 for the current priority queue.

If yes, proceed to step 94, in which a MAC-d transmittal is prepared if step 86, 88, 90 and 92 have been executed for this priority queue. All prepared MAC-d PDUs to the new Node-B are transmitted, and the steps according to FIG. 12 are executed to update the SNB for the target Node-B.

Subsequently, the procedure returns to step 82.

In step 86, following a no to step 84, the RNC fetches MAC-d PDU with SN equal to 1st pos in SN bitmap and prepares it for retransmission.

In step 88, the RNC rearranges the previously prepared MAC-d's such that the last prepared MAC-d is to be sent first and so forth.

In step 90, the SN bitmap is updated moving 2nd position to 1st position and so forth. A NULL value will be set in last position.

In step 92, UNACK_MACD_CNT is decreased by one, and the process continues at step 84.

Hence, there is provided:

A method in a first base (Node_B_S) station adapted to receive media access control layer packet data units (PDU 101, 102, 104, 105) from a radio network controller (RNC) relating to at least a traffic flow (priority queue) relating to a user entity (UE_Q) and forwarding such packet data units to a given user entity.

The transmission to the given user entity is adapted to be potentially handed over to at least a second radio base station (Node B_T), the method being characterized in the following steps:

the first base station (Node_B_S) continuously updating (12, 33, 335, 41) at least a data structure (UNACK_MACD_CNT) relating to media access control layer packet data units (MAC-d PDU's) of a priority queue of the user entity, which packet data units are recently transmitted from a protocol layer (RLC) in the radio network controller (RNC RLC) whereby at least some of said packet data units may not be received by a corresponding protocol layer (RLC) in the user entity (UE_Q) yet, the first base station, upon receiving a predetermined signal (UNACK_MACD_REQ (108)) from the radio network controller requesting the data structure, transmitting (41, 110) a current value of said data structure (UNACK_MACD_CNT) to the radio network controller (RNC).

According to one embodiment, the updating of the data structure may follow upon a completion of an automatic repeat request (HARQ) process, in which a frame is scheduled for transmission to the user entity from the first base station, upon which completion the number of MAC-d PDU's per priority queue and corresponding transmit sequence number (TSN) for the completed automatic repeat request (HARQ) process are reported (24) to a scheduler in the first base station.

Subsequent to the reporting and following a transmit sequence number reaching a bottom of window (32), the first data structure may be updated by decreasing (335) the value of the first data structure by the number of MAC-d packets for the reported transmit sequence number.

The first and second radio base stations and the radio network controller may advantageously operate according to a standard where media access control layer packet data units comprise MAC-d packet data units from a radio network controller (RNC) relating to at least a traffic flow relating to a given user entity (UE_Q) and MAC-hs/MAC-ehs packet data units transmitted from the first or the second base station to said user entity, the method may further comprise the step of the first base station calculates the data structure (UNACK_MACD_CNT) as the amount of MAC-d PDU's stored in a flow buffer and all MAC-d PDU's transmitted in a MAC-hs/MAC-ehs PDU's up to and including the earliest sent unacknowledged MAC-hs/MAC-ehs PDU (BOW).

For the case of a MAC-d PDU is being split such that a first part of a MAC-d is sent in a first MAC-ehs (or MAC-ehs's) and the second part of the MAC-d is sent in a subsequent MAC-ehs, only the latter is contributing to the UNACK_MACD_CNT, whereas all other MAC-ehs stemming from the splitted MAC-d PDU does not contribute to UNACK_MACD_CNT.

For the case that a MAC-ehs PDU comprises MAC-d's from more than one priority queue, the HARQ process (22) is storing the number of MAC-d PDU's and the corresponding priority queue-id for each priority queue that is present in the MAC-ehs together with the transmit sequence number.

Concerning the RNC according to the invention, there is provided

Figure 2:
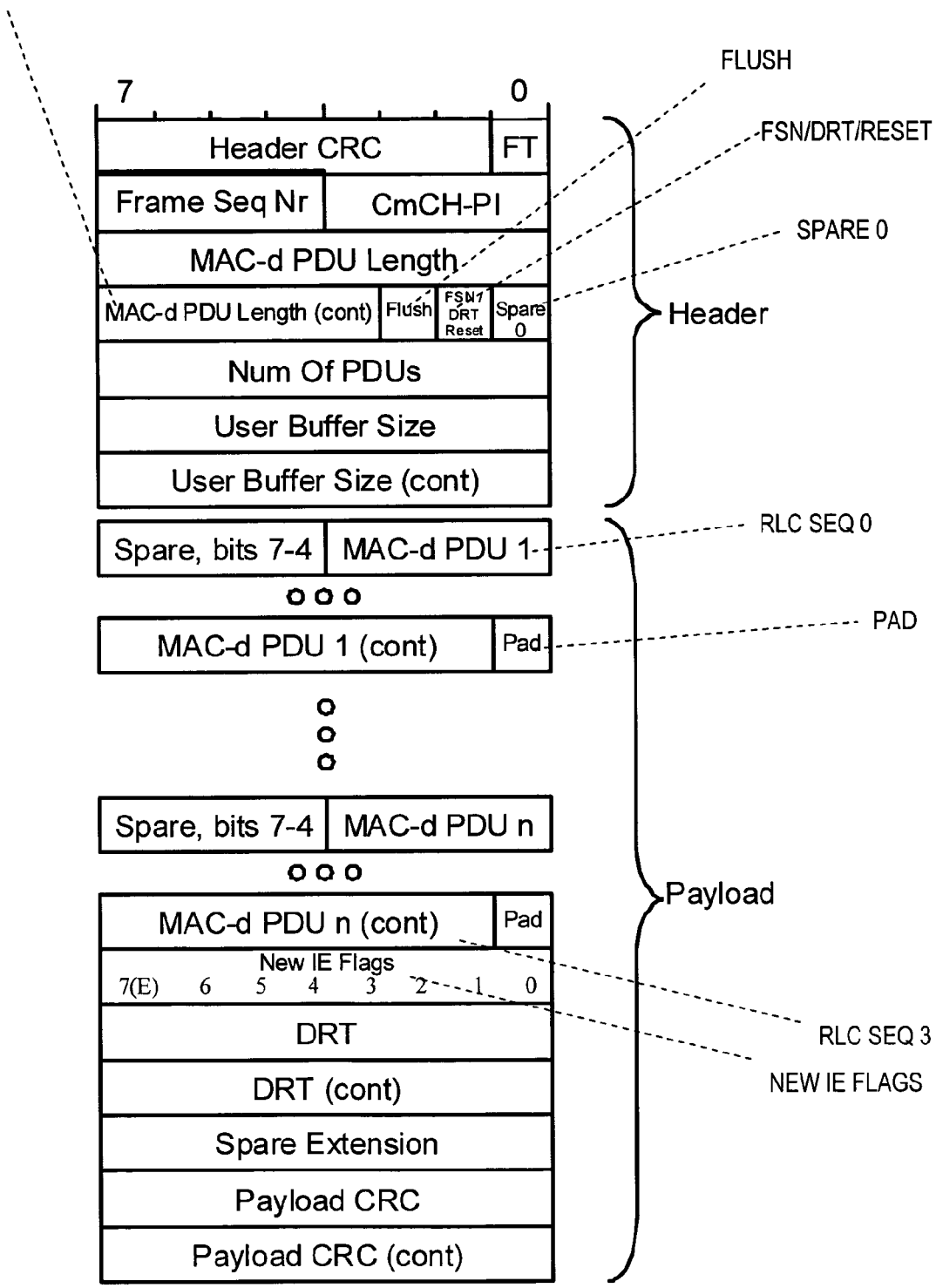
FIG. 2 shows a known HS_DSCH data frame format.

A method for a radio network controller (RNC) adapted to receive packet data units (PDU 101, 102, 104, 105, FIG. 2) relating to at least a traffic flow relating to a user entity (UE_Q) to a base station for further forwarding of such packet data units to a given user entity, wherein the transmission is adapted to be potentially handed over to at least a second radio base station (Node B_T), the method being characterized in the following steps:

maintaining a sequence number bitmap (SNB) relating to a priority queue of a user entity and comprising a list of sequence numbers last transmitted to a base station to a user entity as perceived by the radio network controller.

The sequence bitmap may comprise transmitted and retransmitted sequence numbers and the transmitted and retransmitted sequence numbers are preferably listed in the bitmap in the order at which the packet data units are sent.

According to the invention, the sequence bitmap is used as a basis for performing retransmissions at handover to the second base station.

According to a further embodiment, a modified sequence number bitmap (SNB_T) is derived from the first base station sequence number bitmap (SNB_S).

According to a further embodiment of the invention, the modified bitmap (SNB_T) is accomplished at the radio network controller (RNC) by a procedure wherein the effective length of the bitmap, that is the amount of last transmitted sequence numbers is limited to a value of a data structure as indicated by the first radio base station, (UNACK_MACD_CNT).

The modified bitmap (SNB_T) is created, according to one embodiment of the invention, by copying a number of top entries corresponding to the amount indicated by the value of the data structure (UNACK_MACD_CNT), while the remaining entries of the modified bitmap are constituted by null values.

Base Station

Figure 16:
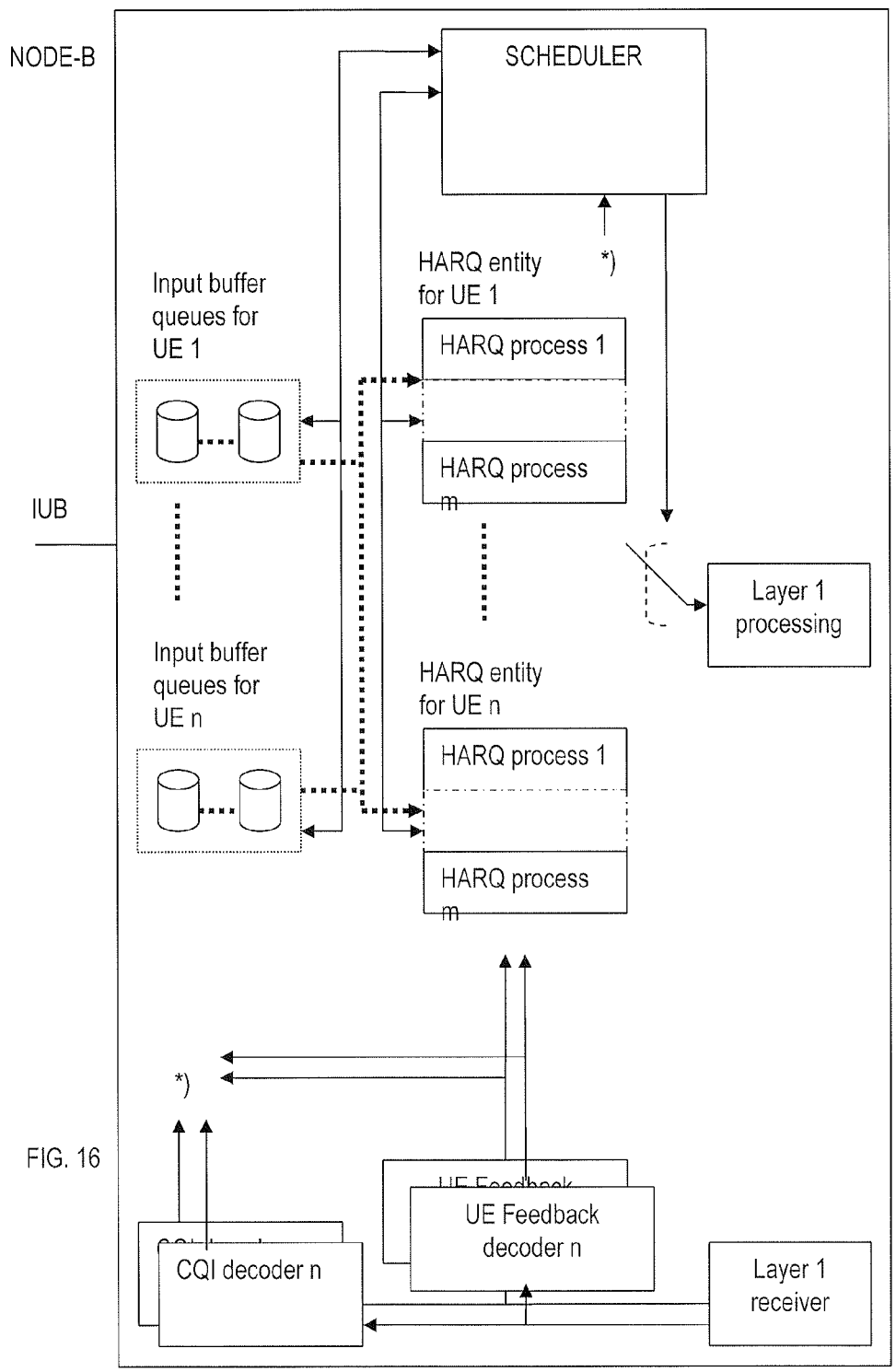
FIG. 16 shows a Node B in which the invention may be implemented.

In FIG. 16, diagram of a base station set (Node B) in which the method for the base station according to the invention may be implemented is shown.

The base station set, node B, 50, comprises a scheduler, SCHEDULER, a number of input buffers, storing segments of data streams pertaining to individual user entities, UE1-UEn. For each UE a HARQ entity, each comprising a number of HARQ processes for handling simultaneous transmissions to several UE's, that is, for each user entity as well, Layer 1 processing means for transferring data from respective HARQ processes. The base station moreover comprises a CQI decoder, a user entity (UE) feedback decoder and a layer 1 receiver.

Each HARQ process, in a given user entity is mirrored in Node B, and corresponds to a given data stream which is received by a particular user entity. As explained above, more data streams may be used by the user simultaneously corresponding to one application or more simultaneous applications running on the user entity apparatus, possibly with different QoS requirements. Moreover, consecutive data may be transmitted for the same user entity, the consecutive transmission belonging to different HARQ processes.

Moreover, Node B comprises at least one specific input buffer queue dedicated to a corresponding set of HARQ processes.

The base (Node_B_S) station, which may be denoted a first base station, is adapted to receive media access control layer packet data units (MAC-d; PDU 101, 102, 104, 105) from a radio network controller (RNC) relating to at least a traffic flow relating to a given user entity (UE_Q) and forwarding (MAC-hs/MAC-ehs) such packet data units to said user entity wherein the transmission to the given user entity is adapted to be potentially handed over to at least a second radio base station (Node B_T), the method being characterized in the following steps:

the first base station (Node_B_S) continuously updating (12, 33, 335, 41) at least a data structure (UNACK_MACD_CNT) relating to media access control layer packet data units (MAC-d PDU's) of a priority queue of the user entity, which packet data units are recently transmitted from a protocol layer (RLC) in the radio network controller (RNC RLC) whereby at least some of said packet data units may not be received by a corresponding protocol layer (RLC) in the user entity (UE_Q) yet, the first base station, upon receiving a predetermined signal (UNACK_MACD_REQ (108)) from the radio network controller requesting the data structure, transmitting (41, 110) a current value of said data structure (UNACK_MACD_CNT) to the radio network controller (RNC).

RNC

Figure 15:
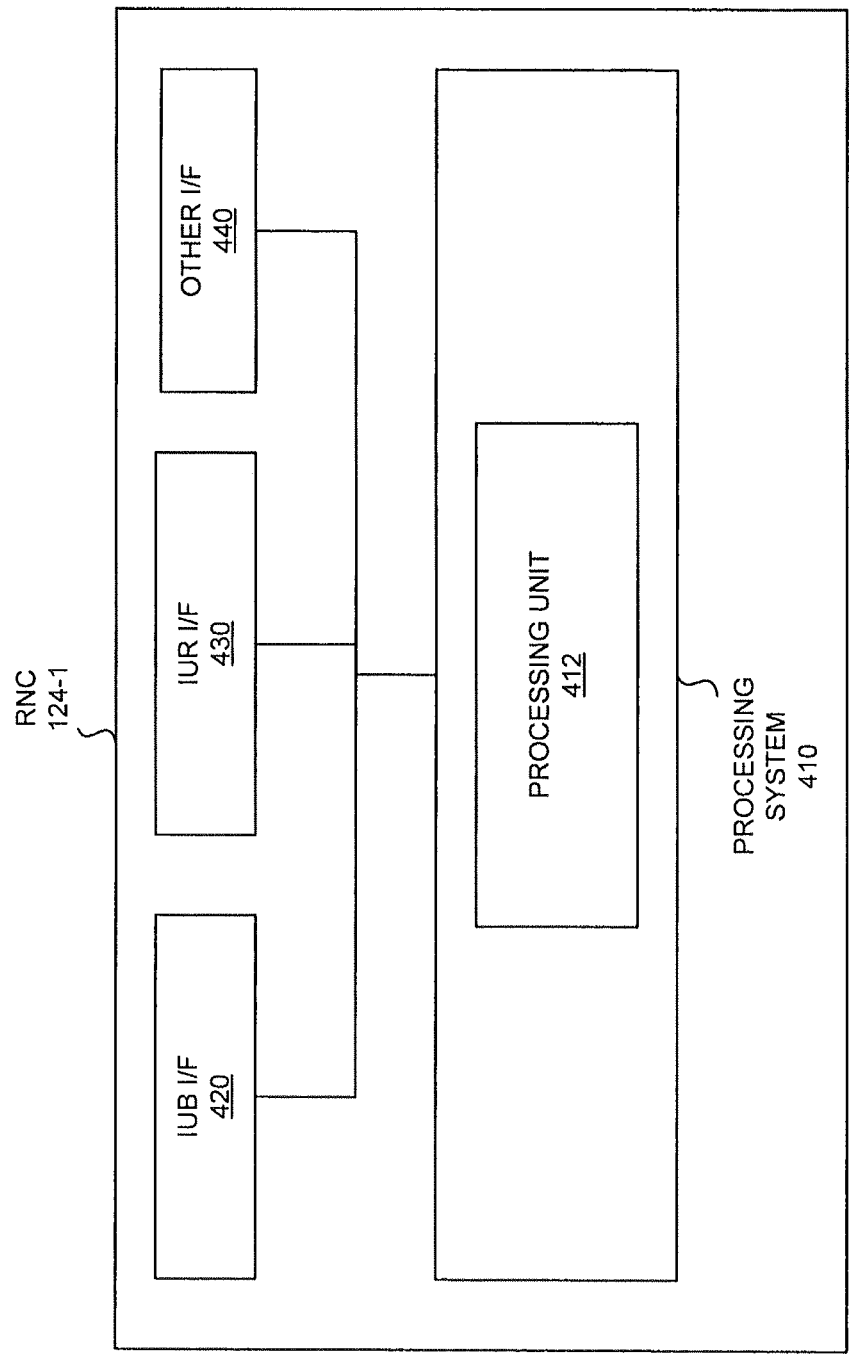
FIG. 15 shows a RNC in which the invention may be implemented.

FIG. 15 shows a radio network controller according to which the method for a radio network controller according to the invention may be implemented.

Such a radio network controller has also been shown in FIG. 4 of WO2008/097168. The Radio network controller 124-1 comprises a processing system 410 which comprises a processing unit 412. A number of interfaces 420, 430 and 440 are provided.

The method for the radio network controller according to the invention may be implemented in software and carried out by processing unit 412.

The radio network controller (RNC) is adapted to receive packet data units (PDU 101, 102, 104, 105, FIG. 2) relating to at least a traffic flow relating to a user entity (UE_Q) to a first base station for further forwarding of such packet data units to a given user entity, wherein the transmission is adapted to be potentially handed over to at least a second radio base station (Node B_T), the method being implemented in the radio network controller comprises at least the following step:

maintaining a sequence number bitmap (SNB) relating to a priority queue of a user entity and comprising a list of sequence numbers last transmitted to a base station to a user entity as perceived by the radio network controller.

Advantages Of The Invention

By using the signalling according to the invention between Node-B and RNC, and by performing immediate retransmission of data from the RNC to the new Node-B, it is estimated that the reduced MAC-hs downloading rate due to effect of cell changes can be minimized.

The effect of cell changes will be more severe the higher the total downlink throughput is. In a scenario with decreasing cell sizes (pico cells), the advantageous effects of the invention are therefore deemed to be particular attractive.

E.g. it is likely that a less capable UE in terms of receive capability operating with no cell changes will outperform a high performance UE involved in multiple cell changes since the prior art negative effect of delay and delay jitter will be noticeable. E.g. a 3.6 Mbps capable UE device operating in a HSDPA environment with a maximum downlink bit rate of 14.4 Mbps, which UE device operates according to the present invention and which UE experiences many cell changes, will perform better than a UE capable of 11.5 Mbps in a maximum 45 Mbps network, with the same amount of handovers—but not operating in a network with the features of the invention—since the effects of discarded data at Node-B will be noticeable.

Abbreviations

HSDPA—High Speed Downlink Packet Access
HS-DSCH—High Speed Downlink Shared Channel
HS_SCCH—Shared Control Channel for HS_DSCH
HS_PDSCH—High Speed Physical Downlink Shared Channel
MAC-hs—Media Access Control—high speed
MAC-ehs—Media Access Control—enhanced high speed
PDU—Protocol Data Unit
ACK—Acknowledgement
NACK—Negative Acknowledgement
DTX—Discontinuous Transmission
EUL—Enhanced Uplink
HARQ—Hybrid Automatic Repeat Request
CQI—Channel Quality Indicator
TSN—Transport Sequence Number
RLC—Radio Link Control
SN—Sequence Number
UE—User Equipment
CRC—Cyclic Redundancy Check
TCP—Transmission Control Protocol
DL—Downlink
RGCH—E-DCH Relative Grant Channel
AGCH—E-DCH Absolute Grant Channel
HICH—E-DCH HARQ Acknowledgement Indicator Channel
DCH—Dedicated Channel
CCH—Common Channel
SI—Scheduling Information
MIMO—Multiple Input Multiple Output
LTE—Long Term Evolution
E-DCH—Enhanced Dedicated Channel
HTTP—Hyper Text Transfer Protocol References

3GPP, 25.211, 25.321

The invention claimed is:

1. In a first base station adapted to receive media access control (MAC) layer packet data units (PDUs) from a radio network controller (RNC) relating to at least a traffic flow relating to a given user entity and forwarding PDUs to said user entity, wherein the transmission to the given user entity is adapted to be handed over to at least a second radio base station, a method comprising:

continuously updating, by the first base station, at least a data structure relating to MAC layer PDUs of a priority queue of the given user entity, which PDUs are last transmitted from a protocol layer in the radio network controller, whereby at least some of said PDUs may not be received by a corresponding protocol layer in the user entity yet, the data structure indicating a number of MAC layer PDUs that remain to be transmitted from the first base station or remain to be acknowledged by the user entity; and in response to receiving a predetermined signal from the radio network controller requesting the data structure, transmitting, from the first base station to the radio network controller, a current value of said data structure, wherein the first and second radio base stations and the radio network controller operate according to a standard where MAC layer PDUs comprise MAC-d PDUs from a radio network controller (RNC) relating to at least a traffic flow relating to a given user entity and MAC-hs/MAC-ehs PDUs transmitted from the first or the second base station to said user entity, and the step of continuously updating the data structure (UN-ACK_MACD_CNT) comprises:

determining a first value representing the number of MAC-d PDU's stored in a flow buffer;

determining a second value representing the number of MAC-d PDU's transmitted in a MAC-hs MAC-ehs PDU's up to and including the earliest sent unacknowledged MAC-hs/MAC-ehs PDU; and summing the first and second values to produce a third value being the sum of the first and second values, wherein for the case of a MAC-d PDU is split such that a first part of a MAC-d is sent in a first MAC-ehs and the second part of the MAC-d is sent in a subsequent MAC-ehs, only the latter contributes to the UN-ACK_MACD_CNT, whereas all other MAC-ehs stemming from the splitted MAC-d PDU do not contribute to UNACK_MACD_CNT.

2. The method according to claim 1, wherein the updating of the data structure is performed in response to a completion of an automatic repeat request (HARQ) process, in which a frame is scheduled for transmission to the user entity from the first base station, upon which completion the number of MAC layer PDUs per priority queue and corresponding transmit sequence number for the completed automatic repeat request (HARQ) process are reported to a scheduler in the first base station.

3. The method according to claim 2, wherein the step of continuously updating the data structure comprises updating the data structure by decreasing the value of the data structure by the number of MAC layer PDUs for the reported transmit sequence number.

4. The method according to claim 1, wherein for the case that a MAC-ehs PDU comprises MAC-d's from more than one priority queue, the HARQ process is storing the number of MAC-d PDU's and the corresponding priority queue-id for each priority queue that is present in the MAC-ehs together with the transmit sequence number.

5. The method according to claim 1, wherein the first and second base station operates according to the high speed packet data access standard.

6. A base station, the base station being adapted to:
(a) receive media access control (MAC) layer packet data units (PDUs) from a radio network controller (RNC) relating to at least a traffic flow relating to a given user entity and forward PDUs to said user entity,
(b) update, one or more times, a data structure relating to MAC layer PDUs of a priority queue of the user entity, which PDUs are last transmitted from a protocol layer in the RNC whereby at least some of said PDUs may not have been received by a corresponding protocol layer in the user entity, wherein the data structure indicates the number of MAC layer PDUs that remain to be transmitted from the first base station or remain to be acknowledged by the user entity, and
(c) transmit a current value of said data structure to the RNC in response to receiving a predetermined signal sent from the RNC, wherein the base station operates according to a standard where MAC layer PDUs comprise MAC-d PDUs from a radio network controller (RNC) relating to at least a traffic flow relating to a given user entity and MAC-hs/MAC-ehs PDUs transmitted from the base station to said user entity, and the base station is adapted to update data structure (UN-ACK_MACD_CNT) by:

determining a first value representing the number of MAC-d PDU's stored in a flow buffer;

determining a second value representing the number of MAC-d PDU's transmitted in a MAC-hs/MAC-ehs PDU's up to and including the earliest sent unacknowledged MAC-hs/MAC-ehs PDU; and summing the first and second values to produce a third value being the sum of the first and second values, wherein for the case of a MAC-d PDU that is split such that a first part of a MAC-d is sent in a first MAC-ehs and the second part of the MAC-d is sent in a subsequent MAC-ehs, only the latter contributes to the UN-ACK_MACD_CNT, whereas all other MAC-ehs stemming from the splitted MAC-d PDU do not contribute to UNACK_MACD_CNT.

7. In a first base station adapted to receive media access control (MAC) layer packet data units (PDUs) from a radio network controller (RNC) relating to at least a traffic flow relating to a given user entity and forwarding PDUs to said user entity, wherein the transmission to the given user entity is adapted to be handed over to at least a second radio base station, a method comprising:

continuously updating, by the first base station, at least a data structure relating to MAC layer PDUs of a priority queue of the given user entity, which PDUs are last transmitted from a protocol layer in the radio network controller, whereby at least some of said PDUs may not be received by a corresponding protocol layer in the user entity yet, the data structure indicating a number of MAC layer PDUs that remain to be transmitted from the first base station or remain to be acknowledged by the user entity; and in response to receiving a predetermined signal from the radio network controller requesting the data structure, transmitting, from the first base station to the radio network controller, a current value of said data structure, wherein the first and second radio base stations and the radio network controller operate according to a standard where MAC layer PDUs comprise MAC-d PDUs split such that a first part of a MAC-d is sent in a first MAC-ehs and the second part of the MAC-d is sent in a second MAC-ehs, and only the latter contributes to a data structure (UNACK_MACD_CNT), whereas all other MAC-ehs stemming from the splitted MAC-d PDU do not contribute to UNACK_MACD_CNT.

* * * * *

UNITED STATES PATENT AND TRADEMARK OFFICE
CERTIFICATE OF CORRECTION

PATENT NO. : 8,787,312 B2
APPLICATION NO. : 13/142670
DATED : July 22, 2014
INVENTOR(S) : Lindskog et al.

Page 1 of 1

It is certified that error appears in the above-identified patent and that said Letters Patent is hereby corrected as shown below:

In the Claims

In Column 15, Line 23, in Claim 1, delete "MAC-hs MAC-ehs" and insert -- MAC-hs/MAC-ehs --, therefor.

Signed and Sealed this
Nineteenth Day of May, 2015

Michelle K. Lee
*Director of the United States Patent and Trademark Office*